(12) United States Patent
Brandt et al.

(10) Patent No.: US 7,746,067 B2
(45) Date of Patent: Jun. 29, 2010

(54) MACHINE WITH A POSITION-SENSING SYSTEM

(75) Inventors: Everett Gene Brandt, Brimfield, IL (US); David Abraham Paul, Peoria, IL (US); Shoji Tozawa, Peoria, IL (US); Roger Dwight Watkins, Dunlap, IL (US); Balamurugan Sundaram, Peoria, IL (US); Seppo Saario, Brisbane (AU)

(73) Assignee: Caterpillar Inc., Peoria, IL (US)

( * ) Notice: Subject to any disclaimer, the term of this patent is extended or adjusted under 35 U.S.C. 154(b) by 314 days.

(21) Appl. No.: 11/896,392

(22) Filed: Aug. 31, 2007

(65) Prior Publication Data

US 2009/0058401 A1 Mar. 5, 2009

(51) Int. Cl.
*G01B 7/30* (2006.01)
*G06G 7/00* (2006.01)
(52) U.S. Cl. .................................. 324/207.25; 701/50
(58) Field of Classification Search ............ 324/207.11, 324/207.13, 207.15, 207.16, 207.17, 207.22, 324/207.24, 207.25; 701/50
See application file for complete search history.

(56) References Cited

U.S. PATENT DOCUMENTS

| 5,165,271 | A | | 11/1992 | Stepper et al. |
| 5,448,148 | A | * | 9/1995 | Devier ........................ 318/645 |
| 5,699,247 | A | * | 12/1997 | Moriya et al. ................. 701/50 |
| 5,848,485 | A | * | 12/1998 | Anderson et al. ............. 37/348 |
| 6,052,636 | A | * | 4/2000 | Lombardi ..................... 701/50 |
| 6,363,797 | B1 | | 4/2002 | Tokumoto |
| 6,543,571 | B2 | | 4/2003 | Tokumoto |
| 6,611,138 | B2 | * | 8/2003 | Vasiloiu ................. 324/207.12 |
| 6,691,820 | B2 | | 2/2004 | Tokumoto |
| 6,847,876 | B2 | | 1/2005 | Tokumoto |
| 6,973,991 | B2 | | 12/2005 | Tokumoto et al. |
| 6,978,685 | B2 | | 12/2005 | Shiba et al. |
| 6,988,421 | B2 | | 1/2006 | Tokumoto |
| 2004/0251895 | A1 | * | 12/2004 | Eidenvall et al. ....... 324/207.15 |

FOREIGN PATENT DOCUMENTS

JP          10-24881          1/1998

* cited by examiner

*Primary Examiner*—Kenneth J Whittington
(74) *Attorney, Agent, or Firm*—Finnegan, Henderson, Farabow, Garrett & Dunner

(57) ABSTRACT

A machine includes a component. The machine may also include a position-sensing system with a plurality of sensor elements that each generate a signal related to proximity of the sensor element to the component by generating the signal based at least in part on the magnetic permeability of the space adjacent the sensor element and a time-varying magnetic field generated by an electric circuit of the position-sensing system. The machine may also include one or more information-processing devices that determine a positional relationship between the component and the plurality of sensor elements based on a plurality of the signals generated by the sensor elements.

20 Claims, 10 Drawing Sheets

MACHINE WITH A POSITION-SENSING SYSTEM

TECHNICAL FIELD

The present disclosure relates to machines with a position-sensing system for sensing a positional relationship between components of the machine and, more particularly, to machines with a position-sensing system having at least one sensor element that generates a signal related to proximity of the sensor element to a component.

BACKGROUND

Many machines include one or more components that move relative to one another. Some such machines include a position-sensing system with a single sensor element that generates a signal related to proximity of the sensor element to some portion of one of the components between which relative motion occurs. For example, a position-sensing system may have a single sensor element that generates a signal related to proximity of the sensor element to some projection of the component, such as a gear tooth. The machine may use the signal from the sensor element as an indication of the positional relationship between the components.

Unfortunately, a number of factors may cause significant variation in the relationship between the proximity of the sensor element to the component and the value of the signal generated by the sensor element. For example, temperature variations, variations in the characteristics of the sensor element, and variations in the characteristics of electricity supplied to the sensor element may all increase or decrease the sensor signal value. Because of variation in such parameters, a position-sensing system employing a single sensor element may indicate the positional relationship between components with undesirably low precision for some applications.

U.S. Pat. No. 6,988,421 to Tokumoto ("the '421 patent") discloses a position-sensing system that uses two sensor elements to determine the rotational position of a gear. Each of the two sensor elements sits radially outward of the teeth of the gear. The gear is constructed of magnetic material. As the gear rotates adjacent the sensor elements, the gear teeth pass the sensor elements, and the sensor elements sense the density of the magnetic flux generated by the gear. Thus, the value of the signal generated by each sensor element cycles up and down as the gear teeth pass the sensor element, thereby providing an indication of the position of the gear relative to the sensor elements.

The '421 patent discloses that the position of the gear and the signal from each sensor element may have a nonlinear relationship in certain ranges. To address this, the '421 patent discloses positioning the two sensor elements so that their sensor signals are out of phase by an amount that prevents the nonlinear operating ranges of both sensor elements occurring at the same time. Thus, at all times, at least one of the sensor elements provides a sensor signal linearly related to the position of the gear.

Although the rotary position-sensing system of the '421 patent uses two sensor elements to sense the position of the gear, certain disadvantages persist. For example, while using two sensor elements positioned as disclosed in the '421 patent addresses nonlinear operating ranges of the sensor elements, it does not address variations in operating parameters that may change the value of both sensor signals. Additionally, in some applications it may prove impractical or imprudent to construct the sensed component out of magnetic material and sense the magnetic flux generated by the sensed component, as disclosed by the '421 patent.

The position-sensing system and methods of the present disclosure solve one or more of the problems set forth above.

SUMMARY OF THE INVENTION

One disclosed embodiment relates to a machine having a component. The machine may also include a position-sensing system with a plurality of sensor elements that each generate a signal related to proximity of the sensor element to the component by generating the signal based at least in part on the magnetic permeability of the space adjacent the sensor element and a time-varying magnetic field generated by an electric circuit of the position-sensing system. The machine may also include one or more information-processing devices that determine a positional relationship between the component and the plurality of sensor elements based on a plurality of the signals generated by the sensor elements.

Another embodiment relates to a position-sensing method that includes supporting a plurality of sensor elements adjacent a component in a manner allowing relative movement between the component and the plurality of sensor elements. The method may also include generating with each of a plurality of the sensor elements a sensor signal related to the proximity of the sensor element to the component. Additionally, the method may include determining a positional relationship between the component and the plurality of sensor elements based at least in part on one or more relationships between a plurality of the sensor signals.

A further embodiment relates to a machine having a component with a series of projections. The machine may also include a position-sensing system, which may include a plurality of sensor elements that are disposed adjacent the series of projections and that each generate a signal relating to the proximity of the sensor element to the component. The plurality of sensor elements may include a row of sensor elements spaced from one another at least partially in a direction of relative motion between the series of projections and the sensor elements. At least two of the sensor elements in the first row may be spaced closer together than an adjacent two of the projections. The position-sensing system may also include one or more information-processing devices that determine at least one positional relationship between the component and the plurality of sensor elements based at least in part on the signals generated by the first row of sensor elements.

DETAILED DESCRIPTION

Figure 1A:
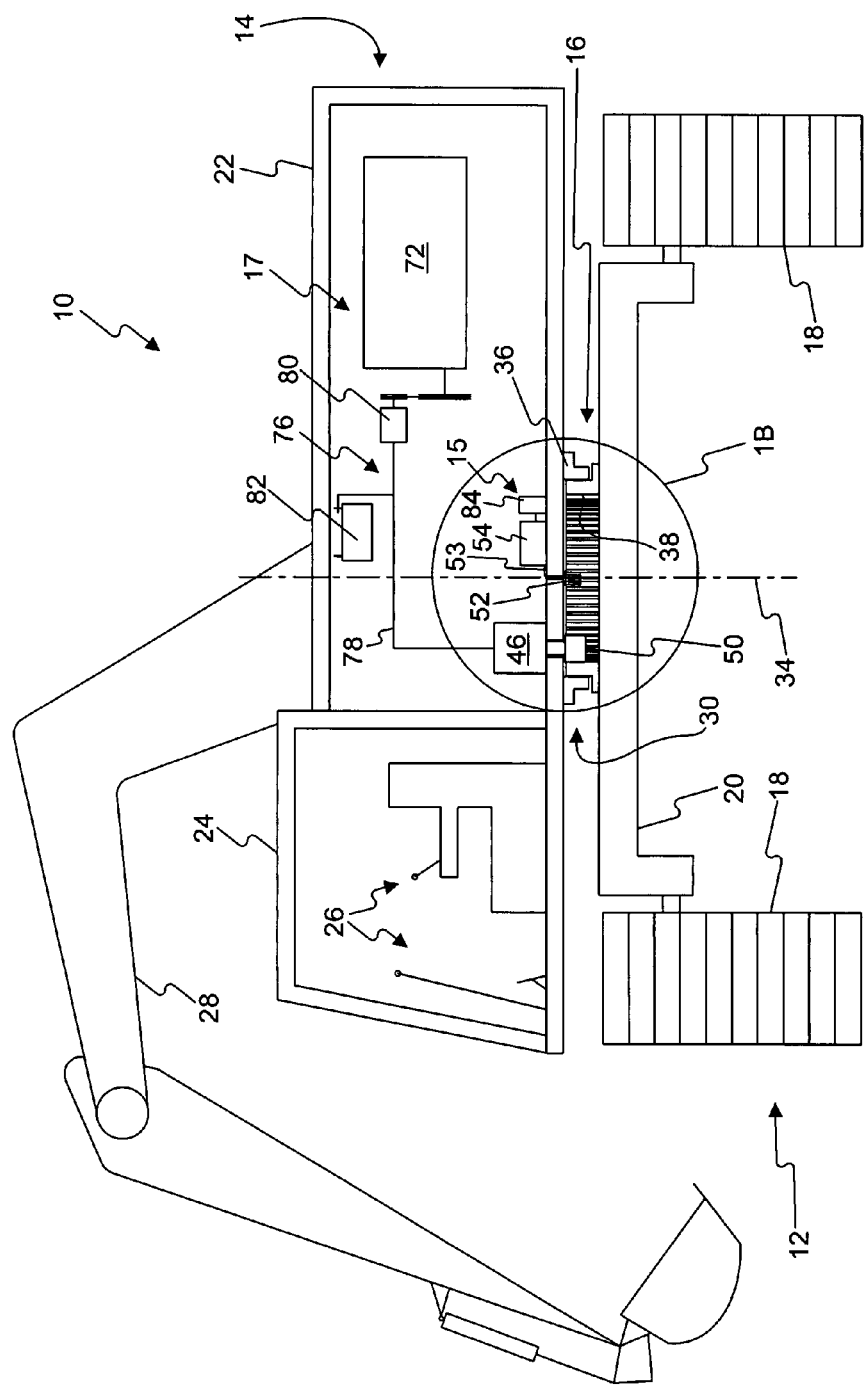
FIG. 1A is a schematic illustration of a machine and a position-sensing system according to the present disclosure.

FIGS. 1A-1E show a machine 10 according to the present disclosure. Machine 10 may be any type of machine having two components that move relative to one another and a position-sensing system 15 for sensing a positional relationship between those two components. In some embodiments, machine 10 may be an excavator with an undercarriage 12, a superstructure 14, a pivot system 16, and a power system 17. As is discussed in greater detail below, position-sensing system 15 may be configured to sense the positional relationship between superstructure 14 and a component of pivot system 16. Undercarriage 12 may include propulsion devices 18, such as track units, for propelling machine 10. Undercarriage 12 may also include a frame 20 suspended from propulsion devices 18. Superstructure 14 may include a body 22 having an operator station 24 with operator controls 26. Superstructure 14 may also include an implement 28, such as a digging arm.

Figure 1B:
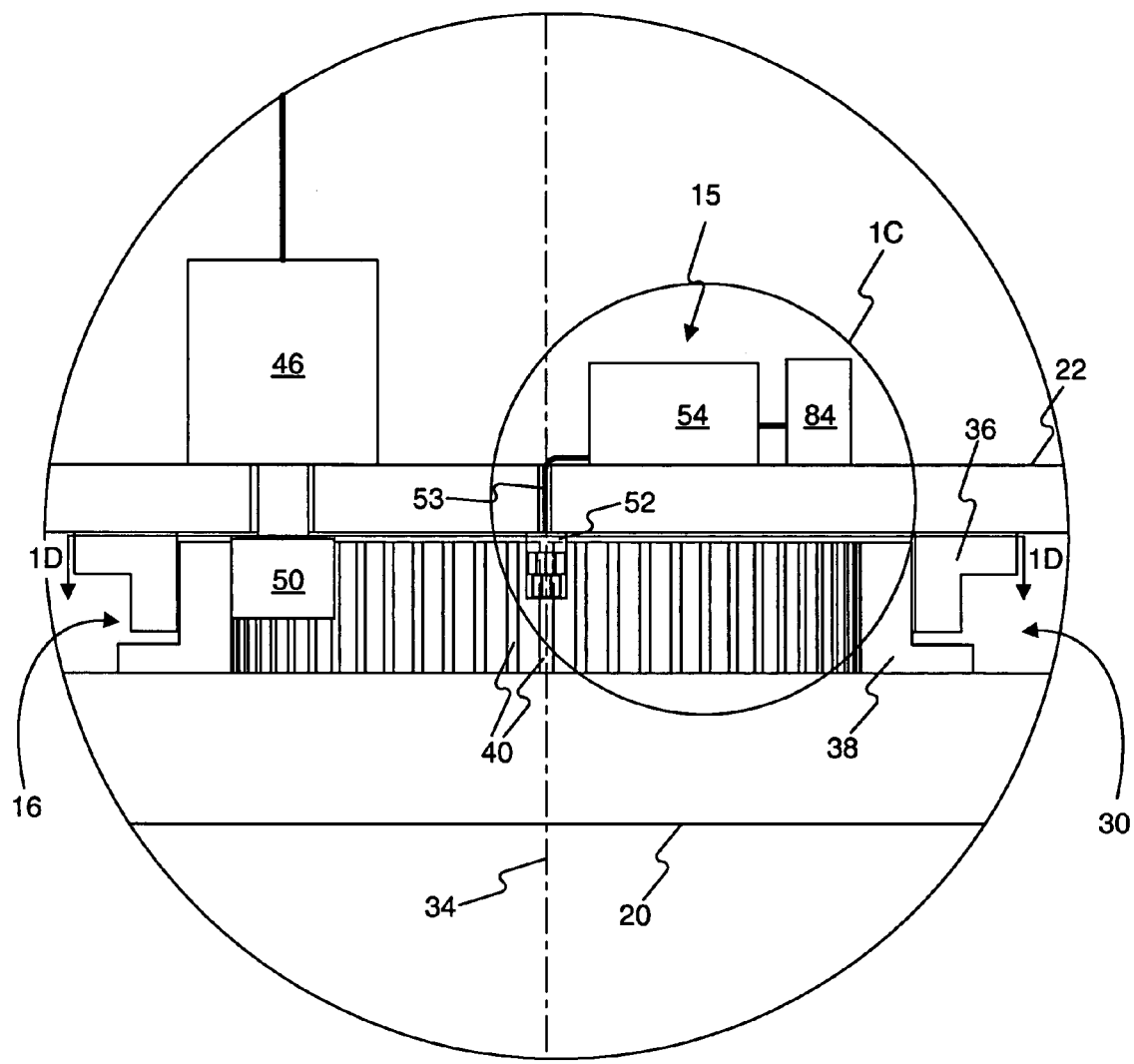
FIG. 1B is close-up view of the portion of FIG. 1A shown in circle 1B.

Power system 17 may include any component or components operable to provide power to one or more other components of machine 10. For example, power system 17 may include an engine 72 and a primary electrical system 76. Primary electrical system 76 may include one or more electrical power sources connected to an electrical distribution network 78 that supplies electricity to many electrical loads of machine 10 when primary electrical system 76 is activated. Primary electrical system 76 may be activated or deactivated by, for example, an ignition switch (not shown) of operator controls 26. The power sources of primary electrical system 76 may, in some embodiments, include an electric generator 80 drivingly connected to engine 72 and a primary battery 82. Power system 17 may also include other power sources, one or more of which may be dedicated to particular power loads. For example, as FIGS. 1A and 1B show, position-sensing system 15 may include a backup battery 84.

Pivot system 16 may connect undercarriage 12 and superstructure 14. Pivot system 16 may include a swing bearing 30 and a drive motor 46. As best shown in FIG. 1B, swing bearing 30 may include an inner race/gear 38 mounted to frame 20 and an outer race 36 that superstructure 14 mounts to. Both inner race/gear 38 and outer race 36 may extend concentric to an axis 34. Inner race/gear 38 and outer race 36 may be engaged to one another via rolling elements (not shown), such as ball bearings, in such a manner that outer race 36 and superstructure 14 may pivot around axis 34 relative to frame 20.

Figure 1C:
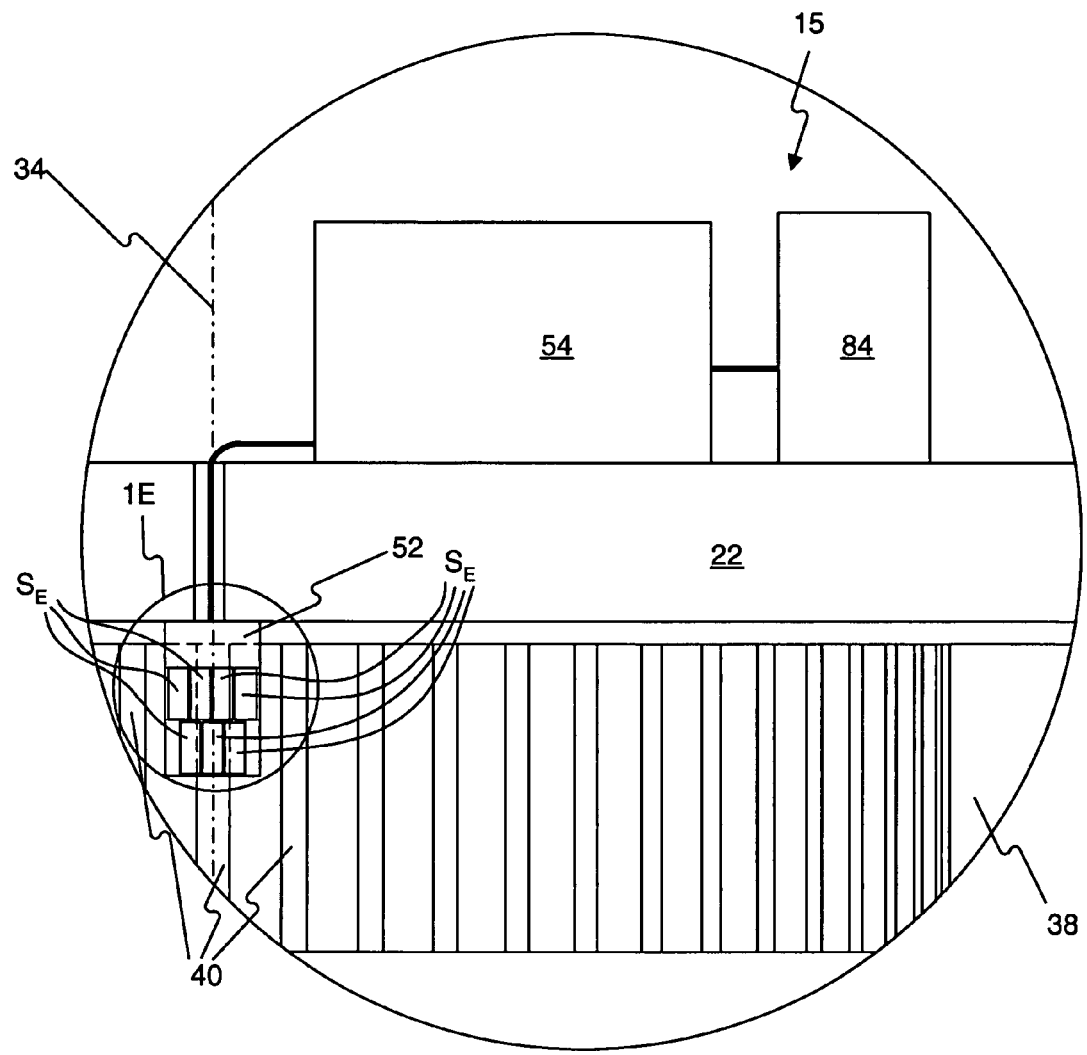
FIG. 1C is a close-up view of the portion of FIG. 1B shown in circle 1C.
Figure 1D:
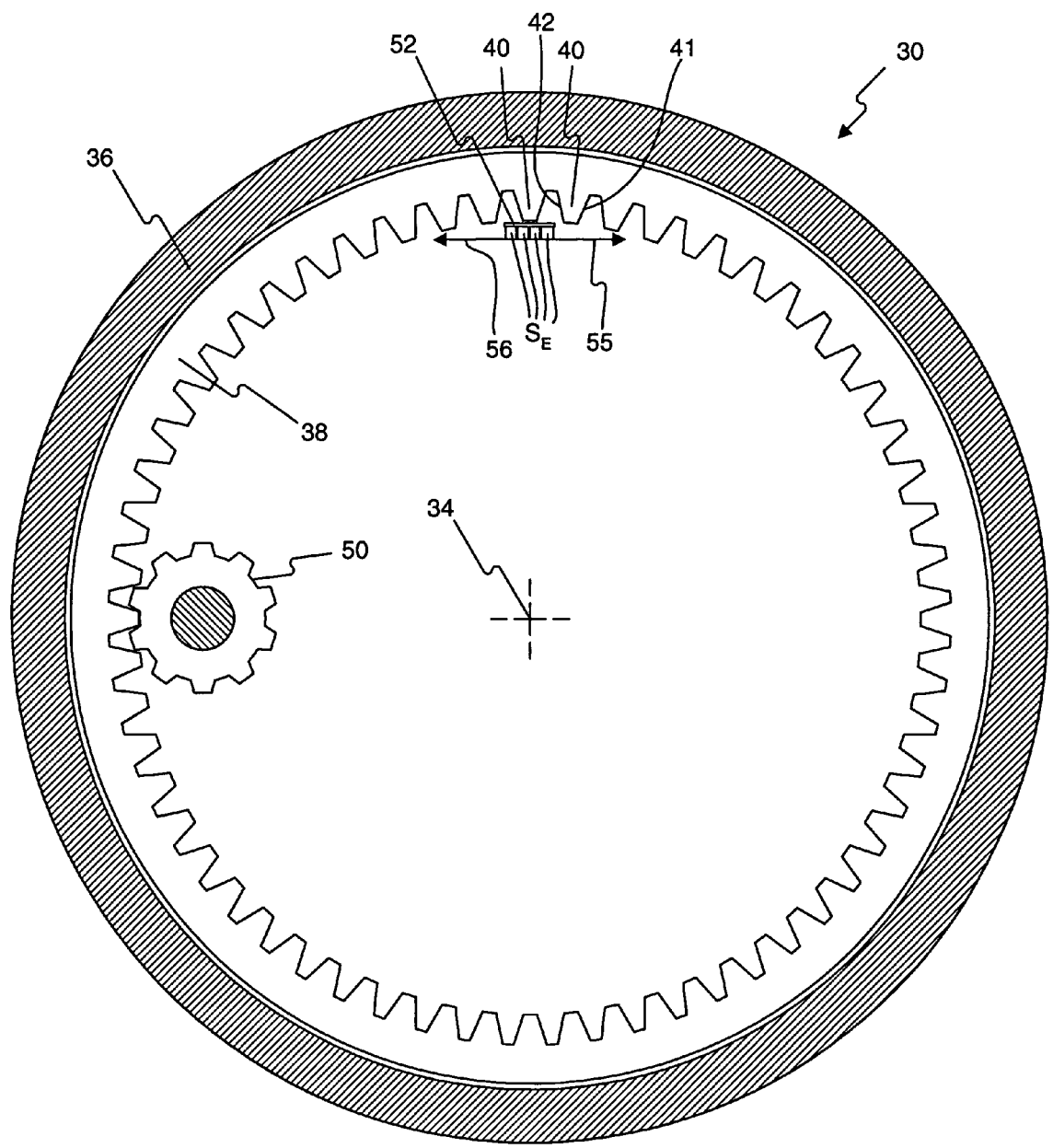
FIG. 1D is a sectional view through line 1D-1D in FIG. 1B.
Figure 1E:
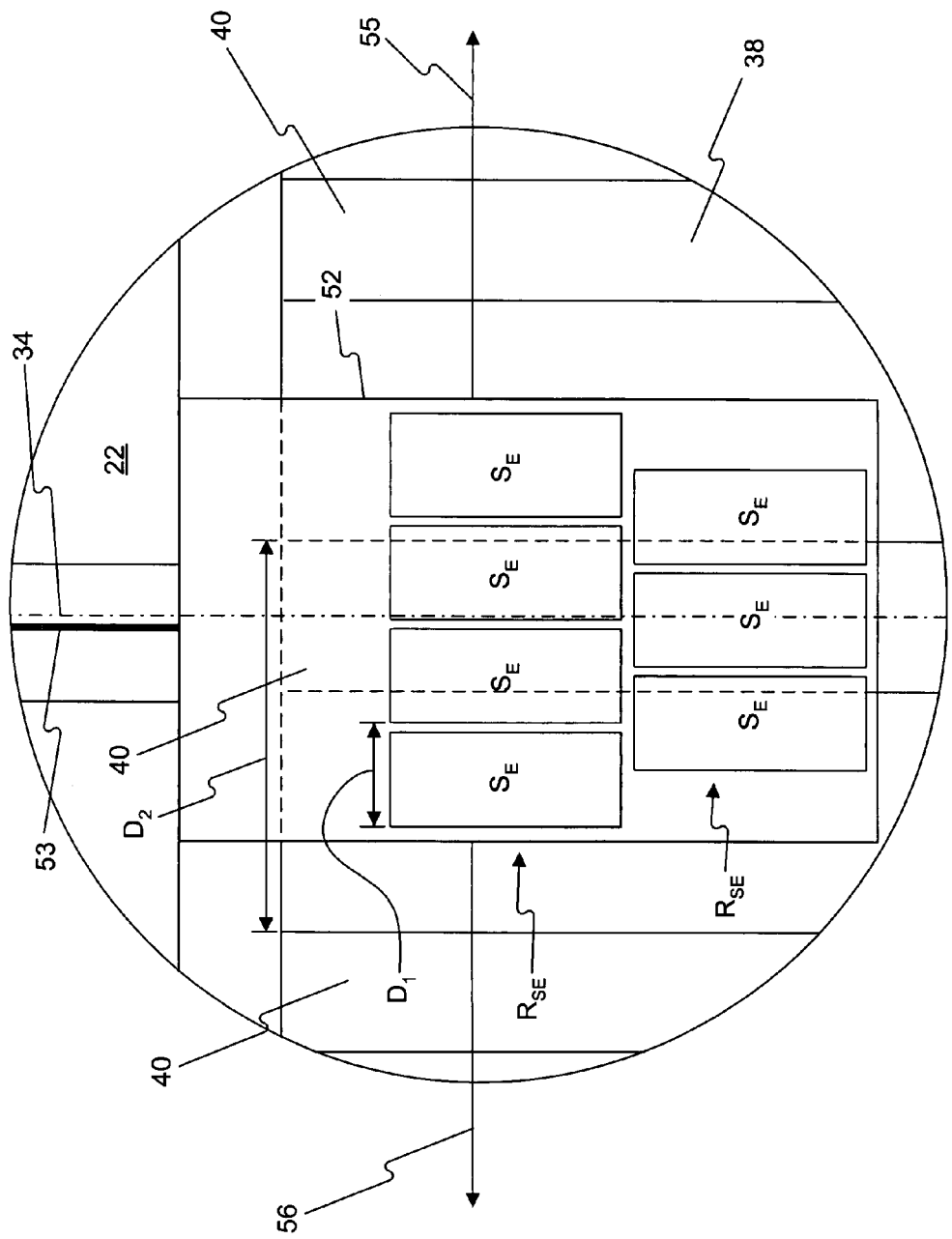
FIG. 1E is a close-up view of the portion of FIG. 1C shown in circle 1E.

As best shown in FIG. 1D, inner race/gear 38 may include a series of gear teeth 40 extending around its inner circumference. Each gear tooth 40 may have a pair of opposite gear tooth edges 41, 42. Each of gear teeth 40 may extend radially inward toward axis 34. FIGS. 1B, 1C, 1E show those portions of gear teeth 40 disposed behind a sensor element group 52 (discussed further below) in dashed lines.

In some embodiments, inner race/gear 38 and gear teeth 40 thereof may be constructed of ferromagnetic material, such as cast iron or steel. In some embodiments, inner race/gear 38 may have unknown and/or non-uniform residual magnetic fields therein for various reasons. For example, in some embodiments, inner race/gear 38 may have undergone an induction hardening process that produces unknown and non-uniform residual magnetic fields in inner race/gear 38.

Motor 46 may be operable to rotate superstructure 14 and outer race 36 around axis 34. Motor 46 may have a gear 50 mounted to its output shaft, and motor 46 may mount to superstructure 14 in a position such that gear 50 meshes with gear teeth 40 of inner race/gear 38. Motor 46 may receive power to rotate superstructure 14 and outer race 36 around axis 34 from various components of power system 17. For example, in embodiments where motor 46 is an electric motor, motor 46 may receive electricity from primary electrical system 76. Similarly, in embodiments where motor 46 is a hydraulic motor, motor 46 may receive pressurized fluid from a hydraulic pump (not shown) of power system 17.

Position-sensing system 15 may be configured to sense the positional relationship between inner race/gear 38 and superstructure 14. Position-sensing system 15 may include a plurality of sensor elements $S_E$ arranged in sensor element group 52, an information-processing device 54, and backup battery 84. Position-sensing system 15 may operate on power from primary electrical system 76 when primary electrical system 76 is activated. When primary electrical system 76 is not activated, position-sensing system 15 may operate on power from backup battery 84.

As best shown in FIG. 1C, information-processing device 54 may be communicatively linked to sensor element group 52 by a communication interface 53. Communication interface 53 may include a plurality of signal lines over which the sensor elements $S_E$ supply to information-processing device 54 sensor signals indicative of the proximity of each sensor element $S_E$ to some portion of inner race/gear 38.

Information-processing device 54 may include any component or components configured to employ the sensor signals from sensor element group 52 in the manners discussed hereinbelow to determine the positional relationship between inner race/gear 38 and superstructure 14. In some embodiments, information-processing device 54 may include signal-conversion components for manipulating the signal from each sensor element $S_E$. For example, information-processing device 54 may include a demodulator (not shown) and an analog-to-digital converter (not shown) for the signal from each sensor element $S_E$. Additionally, information-processing device 54 may include one or more microprocessors (not shown) or other logic devices for executing various algorithms based on the signals received from the sensor elements $S_E$. Information-processing device 54 may also have one or more memory devices (not shown) for storing information, such as operating instructions, data about the relative position of inner race/gear 38 and superstructure 14, and other data about the operating state of machine 10.

As best shown in FIG. 1C, sensor element group 52 may be mounted to superstructure 14 adjacent inner race/gear 38 and communicatively linked to information-processing device 54 via communication interface 53. As best shown in FIG. 1D, sensor element group 52 may be mounted to superstructure 14 adjacent gear teeth 40. For example, as FIG. 1D shows, sensor element group 52 may be mounted radially inward of gear teeth 40. Thus, sensor elements $S_E$ may face radially outward toward the radially-inwardly facing outer tips of gear teeth 40. Mounting sensor element group 52 in this position relative to inner race/gear 38 may ensure that the distance between sensor elements $S_E$ and inner race/gear 38 remains highly consistent during operation of machine 10, as swing bearing 30 may have a construction that allows only a very limited amount of radial movement between superstructure 14 and inner race/gear 38. Maintaining the distance between sensor elements $S_E$ and inner/race gear 38 highly consistent may promote highly precise position sensing.

Additionally, with sensor element group 52 mounted to superstructure 14 in the manner discussed above, when superstructure 14 rotates around axis 34, sensor element group 52 may move in a direction 55 or a direction 56. Thus, directions 55, 56 constitute directions of relative motion between sensor element group 52 and inner race/gear 38.

As FIG. 1E shows, sensor element group 52 may include a plurality of rows $R_{SE}$ of sensor elements $S_E$. The sensor elements $S_E$ in one or more of rows $R_{SE}$ may be spaced from one another at least partially in the directions 55, 56 of relative motion between sensor element group 52 and inner race/gear 38. Each row $R_{SE}$ may extend in a substantially straight direction, as shown in FIG. 1E, or one or more of rows $R_{SE}$ may curve or have bends therein. Rows $R_{SE}$ may be spaced from one another in directions at an angle to the direction in which rows $R_{SE}$ extend. For example, rows $R_{SE}$ may be spaced from one another in a direction substantially transverse to the direction in which rows $R_{SE}$ extend. As best shown in FIG. 1E, adjacent sensor elements $S_E$ in a row $R_{SE}$ may be spaced at a distance $D_1$ in directions 55, 56 smaller than a distance $D_2$ between adjacent gear teeth 40 of inner race/gear 38. In some embodiments, each adjacent pair of sensor elements $S_E$ may be spaced closer together in directions 55, 56 than adjacent gear teeth 40 of inner race/gear 38.

Figure 2:
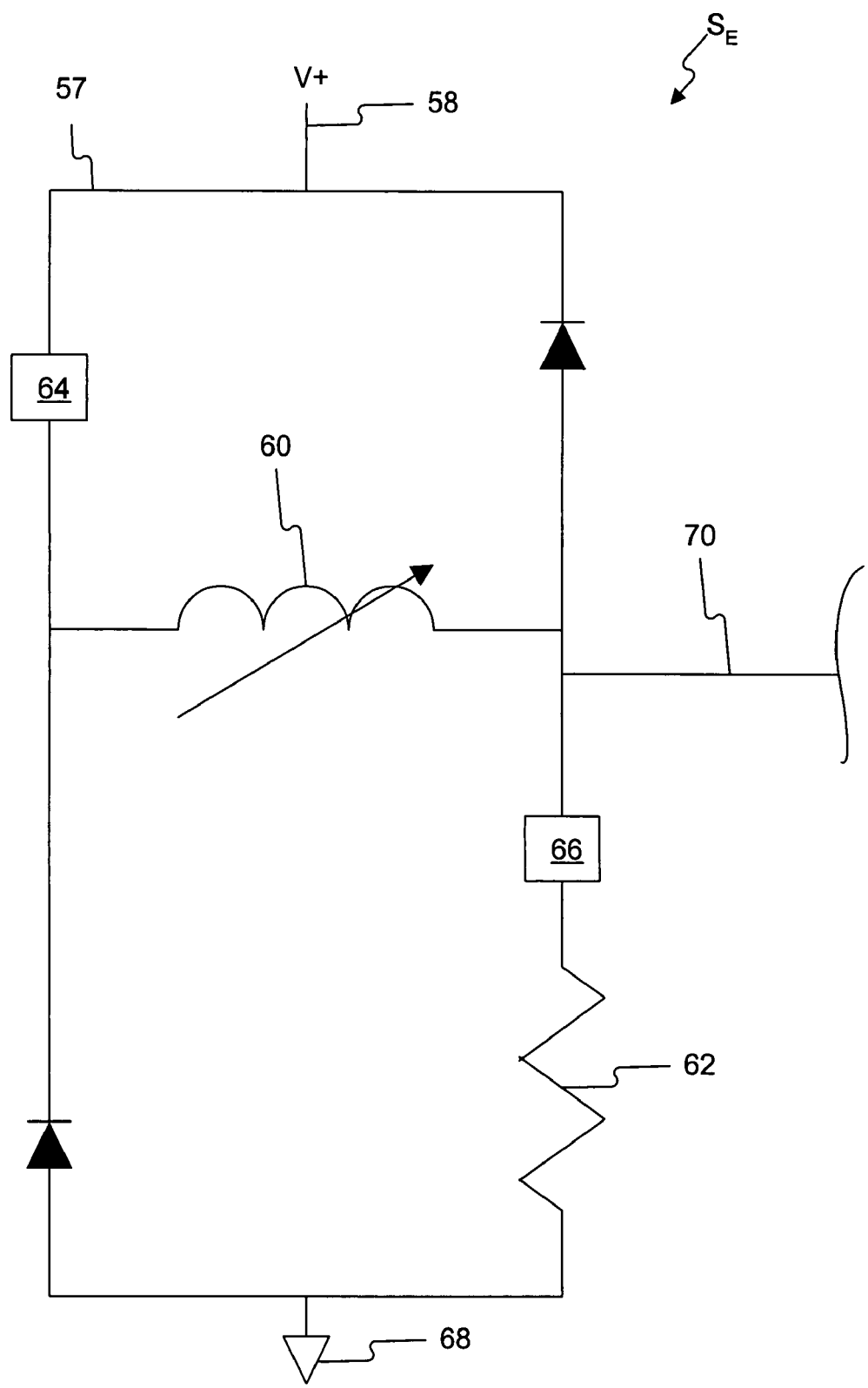
FIG. 2 is a schematic view of one embodiment of a sensor element according to the present disclosure.

Each sensor element $S_E$ may produce a sensor signal related to the proximity of the sensor element $S_E$ to one or more portions of inner race/gear 38. Each sensor element $S_E$ may have various configurations for doing so. In embodiments where inner race/gear 38 is constructed of ferromagnetic material, gear teeth 40 may have a significantly higher magnetic permeability than the vacant spaces between gear teeth 40, and the overall magnetic permeability of the space adjacent each sensor element $S_E$ may therefore depend on the proximity of one of gear teeth 40 to the sensor element $S_E$. Accordingly, in such embodiments, each of sensor elements $S_E$ may have a configuration that allows generating a sensor signal relating to the proximity of the sensor element to a gear tooth 40 of inner race/gear 38 by generating the sensor signal based on the magnetic permeability of the area adjacent the sensor element $S_E$. FIG. 2 shows one such configuration of a sensor element $S_E$.

The configuration of sensor element $S_E$ shown in FIG. 2 is one variety of a type of sensor element often referred to as an induction sensor. The configuration of sensor element $S_E$ shown in FIG. 2 includes an electric circuit 57 with an input 58, an inductor 60, a resistor 62, transistors 64, 66, a ground 68, and a signal line 70. Input 58 may connect to a voltage source. Signal line 70 may connect between inductor 60 and resistor 62. Signal line 70 may connect to information-processing device 54 and supply a voltage signal related to the proximity of inductor 60 to one of gear teeth 40.

During operation, electric circuit 57 may generate a time-varying magnetic field in the area adjacent the sensor element $S_E$ and generate a sensor signal based on that time-varying magnetic field and the magnetic permeability of the area adjacent the sensor element $S_E$. To generate a time-varying magnetic field adjacent the sensor element $S_E$, electric circuit 57 may direct AC current through inductor 60 and resistor 62 to ground 68. With AC current flowing through electric circuit 57 in this manner, inductor 60 may produce a large portion of the resulting time-varying magnetic field generated by electric circuit 57. Transistors 64, 66 may cycle open and closed to impart desired time-dependent characteristics to the AC current flowing through inductor 60 and resistor 62.

With AC current flowing through it, inductor 60 may present an impedance in electric circuit 57. The magnitude of this impedance may depend on the construction of inductor 60 and the characteristics of the AC current flowing through inductor 60. Additionally, the magnitude of the impedance presented by inductor 60 may depend on the permeability of the space adjacent the sensor element $S_E$ and thus the proximity of the sensor element $S_E$ to one of gear teeth 40. The closer one of gear teeth 40 is to sensor element $S_E$, the higher the permeability of the space adjacent the sensor element $S_E$ will be and the higher the inductance and impedance of inductor 60 will be.

Because the impedance of inductor 60 depends on the proximity of one of gear teeth 40 to the sensor element $S_E$, the voltage in signal line 70 also depends on the proximity of one of gear teeth 40 to sensor element $S_E$. The voltage drop between input 58 and ground 68 occurs primarily at two places in electric circuit 57: across inductor 60 and across resistor 68. The closer one of gear teeth 40 is to sensor element $S_E$ and the higher the impedance of inductor 60 is as a result, the higher the voltage drop across inductor 60 will be and the lower the voltage at signal line 70 will be.

Additionally, when the voltage between input 58 and ground 68 changes, the rate of change of the voltage in signal line 70 may depend on the impedance of inductor 60 and thus the proximity of one of gear teeth 40 to sensor element $S_E$. The closer one of gear teeth 40 is to the sensor element $S_E$ and the higher the impedance of inductor 60 is as a result, the more rapidly the density of magnetic flux in the area adjacent the sensor element $S_E$ will change in response to a change in voltage between input 58 and ground 68. The more rapidly the magnetic flux in the area adjacent the sensor element $S_E$ changes in response to a change in voltage between input 58 and ground 68, the more rapidly the voltage drop across inductor 60 and the voltage at signal line 70 will change. Thus, the voltage generated in signal line 70 may serve as a sensor signal indicative of the proximity of the sensor element $S_E$ to one of gear teeth 40.

Figure 3:
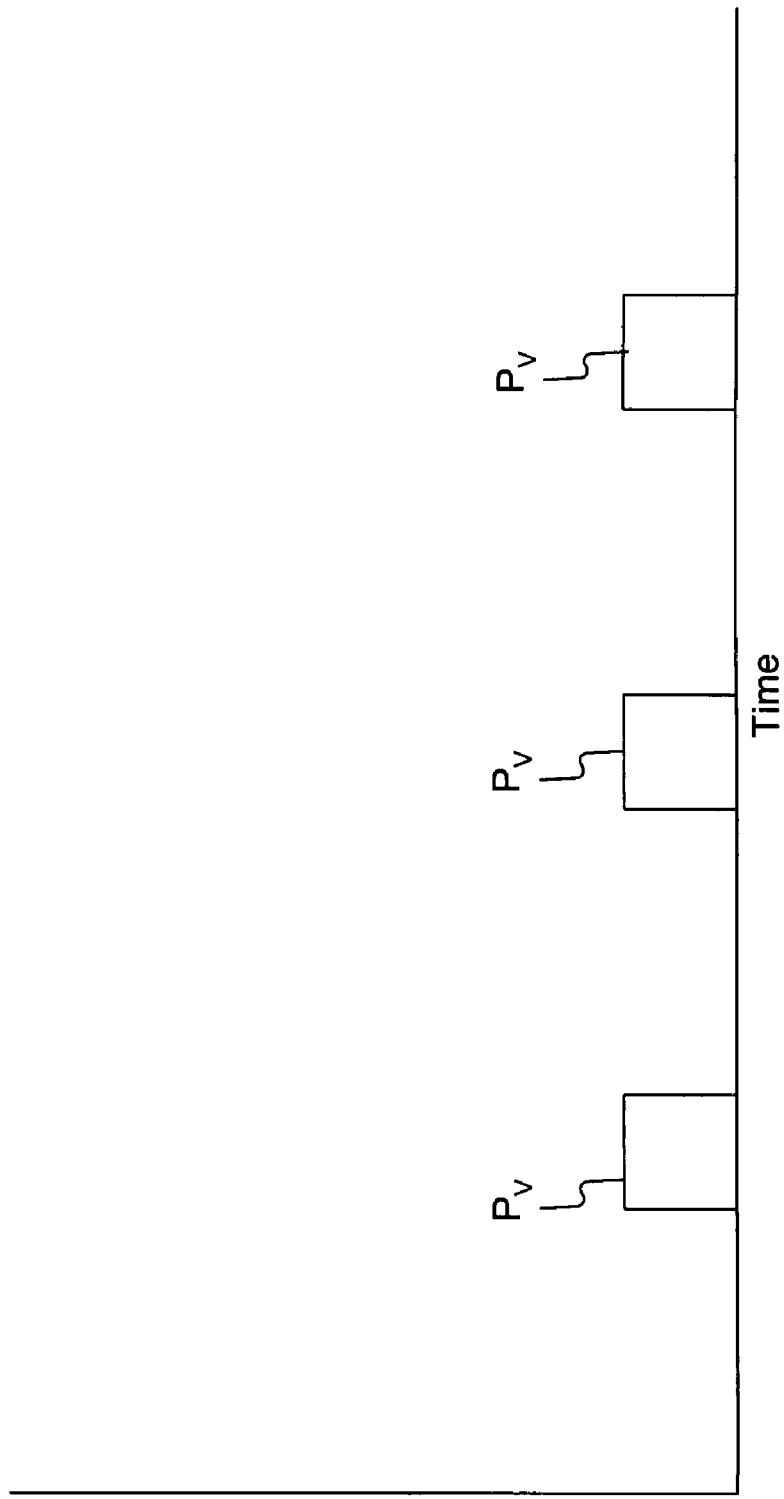
FIG. 3 is a graph illustrating one method of controlling electricity in an electric circuit of a sensing element according to the present disclosure.

Position-sensing system 15 may control the AC current in electric circuit 57 in various ways. In some embodiments, position-sensing system 15 may produce periodic pulses. For example, as FIG. 3 shows, position-sensing system 15 may produce periodic pulses $P_V$ of voltage between input 58 and ground 68. Each voltage pulse $P_V$ may have a predetermined duration that ensures the voltage pulse $P_V$ ends before the density of magnetic flux in the area adjacent the sensor element $S_E$ and the voltage in signal line 70 reach a state of equilibrium. With the AC current in electric circuit 57 controlled in this manner, the voltage in signal line 70 at the end of each voltage pulse $P_V$ depends on and indicates the rate of change of the magnetic flux density in the area adjacent the sensor element $S_E$ during the voltage pulse $P_V$. The rate of change of the flux density in the area adjacent the sensor element $S_E$ during the voltage pulse $P_V$ depends on and indicates the proximity of the sensor element $S_E$ to one of gear teeth 40. Thus, the voltage in signal line 70 at the end of each voltage pulse $P_V$ depends on and indicates the proximity of the sensor element $S_E$ to one of gear teeth 40.

Position-sensing system 15 may use various aspects of the sensor signal in signal line 70 as an indication of the proximity of the sensor element $S_E$ to one of gear teeth 40. In some embodiments, position-sensing system 15 may sample the voltage in signal line 70 at the end of each voltage pulse $P_V$. As discussed above, this voltage may indicate the rate of change of the density of the magnetic flux adjacent the sensor element $S_E$ as a result of the voltage pulse $P_V$ and thus the proximity of the sensor element $S_E$ to one of gear teeth 40. Information-processing device 54 may use this information in various information-processing algorithms to determine a positional relationship between sensor element group 52 and inner race/gear 38. Some such information-processing algorithms are discussed below.

The above-discussed configuration of sensor element $S_E$ and methods of using sensor element $S_E$ to glean information about the proximity of sensor element $S_E$ to one of gear teeth 40 may provide a number of advantages. Generating a time-varying magnetic field in the area adjacent the sensor element $S_E$ with electric circuit 57 allows sensing the proximity of the sensor element $S_E$ to gear teeth 40 by sensing the magnetic permeability of the space adjacent the sensor element $S_E$. Thus, if inner race/gear 38 has a magnetic permeability significantly different from the magnetic permeability between its gear teeth 40, the sensor element $S_E$ may produce a sensor signal indicative of the proximity of the sensor element $S_E$ to one of gear teeth 40, regardless of the magnitude and uniformity of the magnetic field generated within inner race/gear 38.

Additionally, using sensor element $S_E$ to glean information about the rate of change of the density of magnetic flux density adjacent sensor element $S_E$ in response to the time-varying magnetic field may promote accurate determination of the positional relationship between the sensor element $S_E$ and gear teeth 40 in a wide range of circumstances. Unlike some characteristics of inner race/gear 38, such as the magnetic field within inner race/gear 38, the B-H curve of inner race/gear 38 may change very little with age and temperature of inner race/gear 38. As a result, for any given physical relationship of inner race/gear 38 to the sensor element $S_E$ and any given time-dependent variation in the magnetic field, the rate of change of magnetic flux density may be affected very little by aging of inner race/gear 38 or the temperature of inner race/gear 38. Accordingly, using sensor element $S_E$ to glean information about the rate of change of the magnetic flux density adjacent the sensor element $S_E$ in response to the time-varying magnetic field may promote accurate determination of the positional relationship between inner race/gear 38 and the sensor element $S_E$, regardless of the age and temperature of inner race/gear 38.

Position-sensing system 15 is not limited to the configuration discussed above in connection with FIGS. 1A-1E and 2. For example, sensor element group 52 may include different numbers and/or arrangements of sensor elements $S_E$. Sensor element group 52 may include more or fewer sensor elements $S_E$ in each row $R_{SE}$, and sensor element group 52 may include more or fewer rows $R_{SE}$. In some embodiments, sensor element group 52 may include only a single row of sensor elements $S_E$. Additionally, sensor elements $S_E$ may have a different configuration than discussed in connection with FIG. 2. For example, each sensor element $S_E$ may be a known capacitive sensor. Furthermore, position-sensing system 15 may include other information-processing components in addition to, or in place of, information-processing device 54. Moreover, sensor element group 52 may be mounted in a different position with respect to inner race/gear 38. For example, rather than sitting inside inner race/gear 38, sensor element group 52 may be mounted above inner race/gear 38 adjacent gear teeth 40.

Additionally, position-sensing system 15 may use each sensor element $S_E$ differently than discussed above. For example, position-sensing system 15 may use aspects of the sensor signal in signal line 70 other than voltage sampled at the end of each voltage pulse $P_V$. Similarly, position-sensing system 15 may control the electricity in electric circuit 57 in different manner than discussed above.

Additionally, position-sensing system 15 may be configured to sense the positional relationship between components other than superstructure 14 and inner race/gear 38. For example, position-sensing system 15 may be configured with sensor element group 52 positioned to sense the gear teeth of a gear other than inner race/gear 38. Additionally, sensor element group 52 may be positioned adjacent a series of projections other than gear teeth, so that sensor element group 52 may sense one or more of the projections in the series. Furthermore, sensor element group 52 may be positioned to sense a geometric feature of a component other than a series of projections.

Machine 10 may also have a different configuration than shown in FIGS. 1A-1E. For example, machine 10 may omit one or more of propulsion devices 18, operator station 24, operator controls 26, and implement 28. In some embodiments, machine 10 may be a different type of machine than an excavator, and machine 10 may omit undercarriage 12 and/or superstructure 14 altogether and include other types of components and/or systems in place thereof.

INDUSTRIAL APPLICABILITY

Machine 10 may have use in any application requiring relative movement between two components, and position-sensing system 15 may have use in any application requiring information about the positional relationship between two components of machine 10. The information provided by position-sensing system 15 about the positional relationship between two components may be used for various purposes. In the embodiment of machine 10 where position-sensing system 15 provides information about the positional relationship between superstructure 14 and inner race/gear 38, the information may be used, for example, to perform closed-loop control of motor 46 to achieve a desired positional relationship between superstructure 14 and undercarriage 12.

Figure 4:
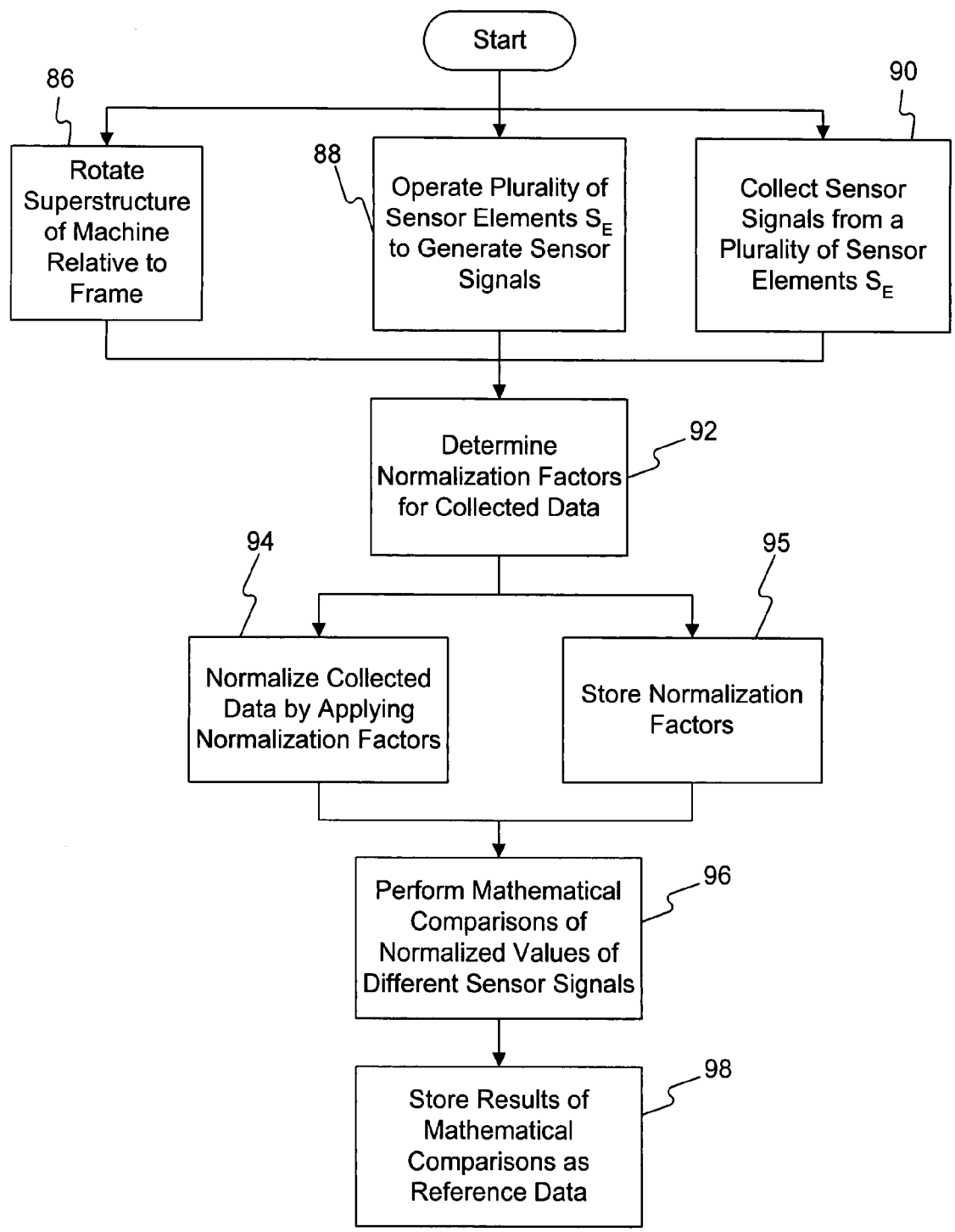
FIG. 4 is a flow chart illustrating one embodiment of a method according to the present disclosure for calibrating a position-sensing system.
Figure 5:
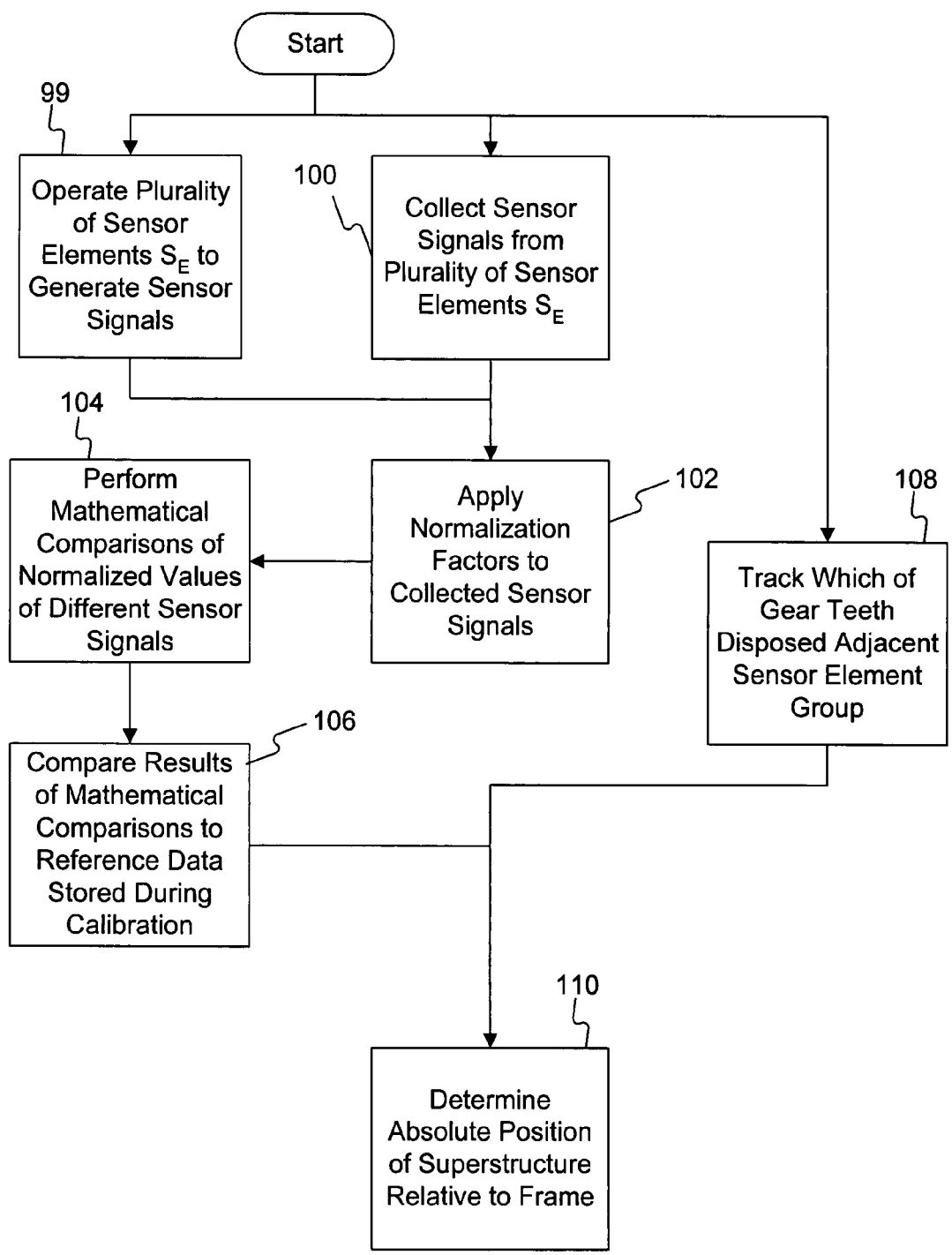
FIG. 5 is a flow chart illustrating one embodiment of a position-sensing method according to the present disclosure.

Position-sensing system 15 may determine the positional relationship between inner race/gear 38 and sensor element group 52 based on a plurality of the sensor signals generated by sensor elements $S_E$. FIG. 4 illustrates one embodiment of a method that may be used to calibrate position-sensing system 15, and FIG. 5 illustrates one embodiment of a method that position-sensing system 15 may use to determine a positional relationship between sensor element group 52 and inner race/gear 38. As FIG. 4 shows, during calibration, motor 46 may be activated to rotate superstructure 14 about axis 34 (step 86), so that sensor element group 52 moves in direction 55 or 56 with respect to gear teeth 40 of inner race/gear 38. Position-sensing system 15 may instigate this rotation of superstructure 14, or an operator may initiate this rotation of superstructure 14. To facilitate successful achievement of the rest of the calibration method, it may prove beneficial if motor 46 rotates superstructure 14 in a relatively smooth manner around rotation axis 34.

While superstructure 14 rotates around rotation axis 34 with respect to undercarriage 12, position-sensing system 15 may operate a plurality of the sensor elements $S_E$ to generate sensor signals related to their proximity to one of gear teeth 40 (step 88). For example, position-sensing system 15 may direct alternating current through the electric circuit 57 of each sensor element $S_E$ in the manner discussed above to provide a voltage signal in its signal line 70 indicative of the proximity of the sensor element $S_E$ to one of gear teeth 40. As each sensor element $S_E$ passes gear teeth 40, its sensor signal may cycle up and down, with the minimum and maximum values of the sensor signal occurring when the sensor element $S_E$ is fully aligned with a gear tooth 40 or a space between gear teeth 40.

While the sensor element group 52 moves in direction 55 or direction 56 relative to inner race/gear 38, information-processing device 54 may collect data relating to the values of the sensor signals generated by a plurality of the sensor elements $S_E$ at different intervals and thus different positions relative to inner race/gear 38 (step 90). For example, during this process, position-sensing system 15 may, as discussed above, sample the voltage in each signal line 70 of each sensor element $S_E$ at the end of each voltage pulse $P_V$ in the circuit 57 of each sensor element $S_E$.

Rotation of superstructure 14 around axis 34 and collection of data from sensor elements $S_E$ may continue for various lengths of time. In some embodiments, this may continue until information-processing device 54 has collected data for a range of motion wherein each sensor element $S_E$ of sensor element group 52 has passed at least two of gear teeth 40 in the same direction. Additionally, information-processing device 54 may collect data from the sensor elements $S_E$ over a range of positions equal to at least the distance between two adjacent gear teeth 40 of inner race/gear 38. To ensure collection of good data, information-processing device 54 may monitor the signals from sensor elements $S_E$ to ensure that superstructure 14 is not rotating in an erratic manner with respect to undercarriage 12. If the signals from sensor elements $S_E$ indicate that superstructure 14 is rotating in an erratic manner, information-processing device 54 may wait for the rotation to become less erratic before it begins using the sensor signals for calibration purposes and/or information-processing device 54 may take action to smooth the rotation of superstructure 14, such as adjusting the operation of motor 46 and/or indicating to an operator of machine 10 to do so.

Information-processing device 54 may then normalize the data collected from the sensor elements $S_E$. In other words, information-processing device 54 may mathematically manipulate the data from the various sensor elements $S_E$ to make the mean value and the peak-to-peak difference the same for the data associated with each sensor element $S_E$. To do so, information-processing device 54 may determine normalization factors that may be applied to the data from each sensor element $S_E$ to harmonize the mean values and peak-to-peak differences of the sensor signals from the different sensor elements $S_E$ (step 92). Subsequently, information-processing device 54 may normalize the data by applying these normalization factors to the data from the different sensor elements (step 94). Information-processing device 54 may also store the normalization factors used to normalize the data associated with each sensor element $S_E$ (step 95).

Information-processing device 54 may then perform mathematical comparisons of the normalized sensor signal data (step 96). This may involve dividing the value of one sensor signal that was collected at each interval by the value of another sensor signal that was collected at the same interval. Alternatively, it may involve subtracting the value of one sensor signal that was collected at each interval from the value of another signal that was collected at the same interval. In some embodiments, information-processing device 54 may mathematically compare each of the sensor signals it receives from a sensor element $S_E$ to at least one other sensor signal. For example, information-processing device 54 may mathematically compare the sensor signals from each adjacent pair of sensor elements $S_E$. Information-processing device 54 may complete the calibration of position-sensing system 15 by storing the results of the mathematical comparisons of the collected data from sensor element $S_E$ as reference data for later use in determining a positional relationship between sensor element group 52 and inner race/gear 38 (step 98). The reference data stored by information-processing device 54 may correspond to a range of relative positions equal to at least the distance between two gear teeth 40 of inner race/gear 38. This ensures that information-processing device 54 may use the reference data and the position-sensing algorithm discussed below in connection with FIG. 5 to accurately determine the relative position between sensor element group 52 and those gear teeth 40 disposed adjacent thereto, regardless of where those gear teeth 40 sit with respect to sensor element group 52.

Mathematically comparing the results of the sensor signals from the sensor elements $S_E$ may provide certain advantages. For example, it may factor out the portions of the sensor signals attributable to those things that influence all of the sensor elements $S_E$ in the sensor element group 52. Such things that affect all of the sensor signals may include any magnetic field generated by inner race/gear 38, the temperature of inner race/gear 38, and variation in the distance between sensor element group 52 and inner race/gear 38. The result of a comparison of the sensor signals from two sensor elements $S_E$ depends primarily on the difference in the proximity of each of those sensor elements $S_E$ to one of gear teeth 40. Accordingly, the results of the mathematical comparisons of the sensor signals collectively serve as a highly pure and accurate indication of the positional relationship between the sensor element group 52 and those gear teeth 40 disposed adjacent the sensor element group 52.

After position-sensing system 15 is calibrated, it may determine a positional relationship between sensor element group 52 and inner race/gear 38 using various information-processing algorithms. For example, position-sensing system 15 may use the information-processing algorithm illustrated in FIG. 5. In this information-processing algorithm, position-sensing system 15 may operate a plurality of sensor elements SE to generate sensor signals relating to their proximity to one of gear teeth 40 (step 99). For example, position-sensing system 15 may produce periodic voltage pulses $P_V$ in the electric circuit 57 of each of a plurality of sensor elements $S_E$, as discussed above. At the same time, position-sensing system 15 may collect the sensor signals from a plurality of sensor elements $S_E$ (step 100). For example, as discussed above, in order to glean information about the rate of change of the magnetic flux density adjacent each of the sensor elements $S_E$, information-processing device 54 may sample the voltage in the signal line 70 of each sensor element $S_E$ at the end of each voltage pulse $P_V$. Information-processing device 54 may then apply the normalization factors stored during calibration (step 95, FIG. 4) to the collected information from each sensor element $S_E$ (step 102), thereby normalizing the values of the collected sensor signals, as was done to produce the reference data during calibration.

Information-processing device 54 may then mathematically compare the normalized values of the sensor signals in the same way it did during calibration (step 104). For example, if information-processing device 54 divided the values of the sensor signals from each adjacent pair of sensor elements $S_E$ during step 96 of the calibration algorithm, information-processing device 54 may do so in step 104 of the position-sensing algorithm. Subsequently, information-processing device 54 may determine a positional relationship between the sensor element group 52 and the gear teeth 40 adjacent thereto by comparing the values resulting from normalizing and mathematically comparing the present sensor signals to the reference data (step 106). For example, information-processing device 54 may determine which relative position between sensor element group 52 and inner race/gear 38 produced a set of normalized and mathematically compared sensor data closest to the present normalized and mathematically compared sensor data. By doing so, information-processing device 54 may determine that the current positional relationship between the sensor element group 52 and the gear teeth 40 disposed adjacent thereto is the same as the positional relationship that produced the reference data most closely matching that resulting from processing of the present sensor signals.

Figure 6:
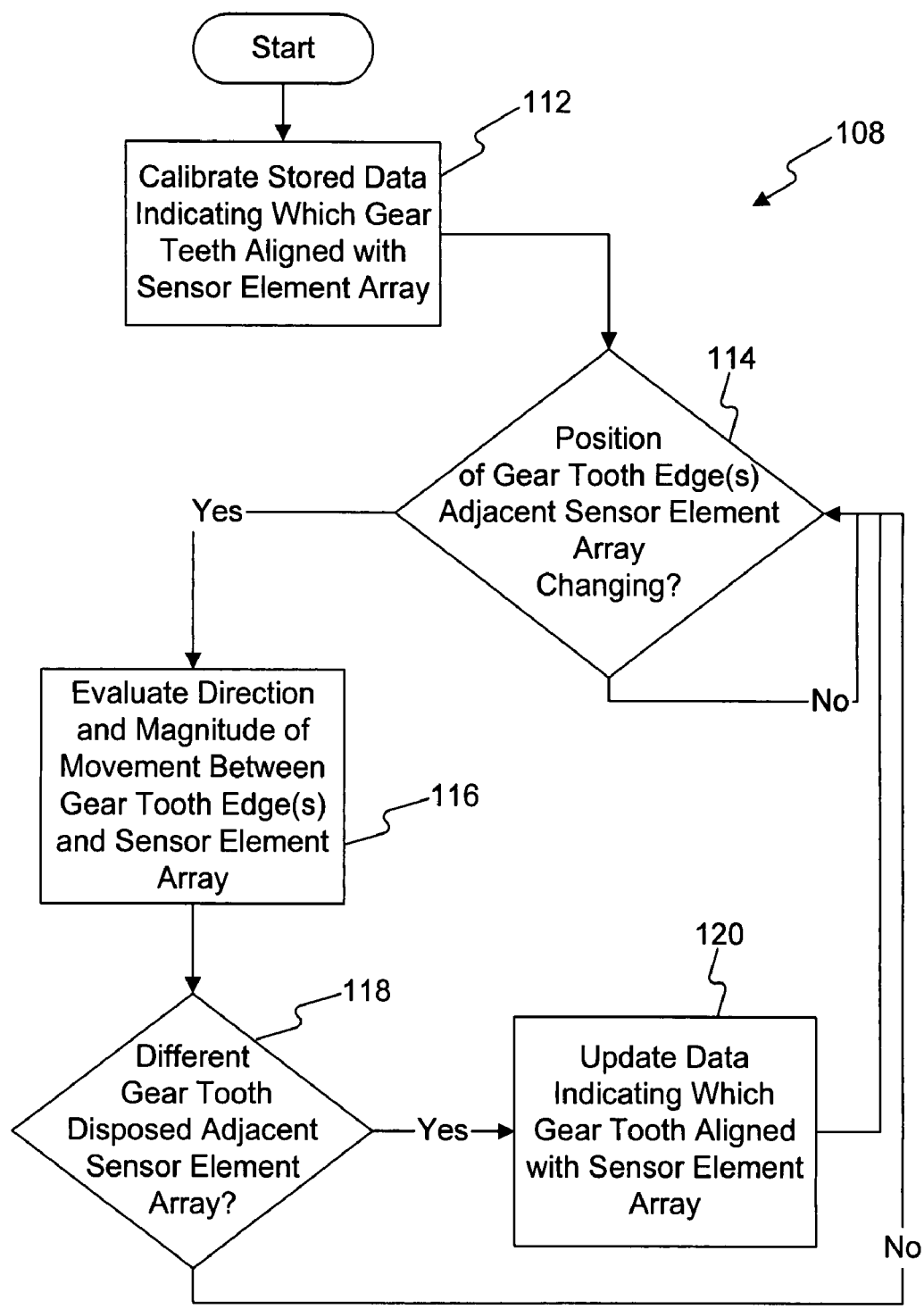
FIG. 6 is a flow chart illustrating a portion of the method shown in FIG. 5 in greater detail.

Of course, this only establishes the positional relationship between sensor element group 52 and whichever of gear teeth 40 happen to be disposed adjacent thereto; it does not establish the absolute angular position of superstructure 14 relative to undercarriage 12. In order to enable determination of the absolute angular position of superstructure 14 relative to undercarriage 12, information-processing device 54 may track which of gear teeth 40 is/are disposed adjacent sensor element group 52 (step 108). Information-processing device 54 may use various methods to do so, one of which is discussed below in connection with FIG. 6. With the information about which of gear teeth 40 are disposed adjacent sensor element group 52 and information about the positional relationship between those gear teeth 40 and sensor element group 52, information-processing device 54 may determine the absolute angular position of superstructure 14 relative to undercarriage 12 (step 110).

As mentioned above, FIG. 6 illustrates one embodiment of a method for keeping track of which gear teeth 40 are disposed adjacent sensor element group 52. Information-processing device 54 may have data stored in its memory that indicates which of gear teeth 40 are disposed adjacent sensor element group 52. Initially, this information may be calibrated (step 112). This may involve changing the data stored in information-processing device 54 to match the gear teeth 40 actually disposed adjacent sensor element group 52, or it may involve changing the position of superstructure 14 and sensor element group 52 so that the gear teeth 40 disposed adjacent the sensor element group 52 matches the data stored in information-processing device 54.

After calibration of the information indicating which of gear teeth 40 are disposed adjacent sensor element group 52, position-sensing system 15 may keep track of which of gear teeth 40 are disposed adjacent sensor element group 52 by updating the stored values for these parameters in response to certain sensed changes in the position of the gear teeth 40 adjacent sensor element group 52. Using the information from step 106 of the information-processing algorithm shown in FIG. 5, information-processing device 54 may repeatedly determine whether the position of the gear teeth 40 adjacent sensor element group 52 is changing (step 114).

When the position of the gear teeth 40 adjacent sensor element group 52 is changing, information-processing device 54 may evaluate the direction and magnitude of the relative movement between sensor element group 52 and gear teeth 40 (step 116). Based on this information, information-processing device 54 may evaluate whether different gear teeth 40 are now disposed adjacent sensor element group 52 (step 118). If so, information-processing device 54 may update the stored data to correctly reflect which gear teeth 40 are now disposed adjacent sensor element group 52 (step 120). By continually executing this method, position-sensing system 15 may accurately track which of gear teeth 40 are disposed adjacent sensor element group 52.

Accurate information about which of gear teeth 40 are disposed adjacent sensor element group 52 allows information-processing device 54 to determine the absolute positional relationship between superstructure 14 and inner race/gear 38 to within a range equal to the spacing between gear teeth 40. As discussed above, position-sensing system 15 may determine the absolute positional relationship between superstructure 14 and inner race/gear 38 with greater precision using the determined positional relationship between sensor element group 52 and the adjacent gear teeth 40.

In some embodiments, however, position-sensing system 15 may sometimes operate in a mode where it keeps track of which gear teeth 40 are disposed adjacent sensor element group 52 without using information about the position of gear teeth 40 relative to sensor element group 52 to provide a more precise determination of position. Keeping track only of which gear teeth 40 are disposed adjacent sensor element group 52 may require less frequent evaluations and less information processing at each evaluation than more precisely determining position. Accordingly, when primary electrical system 76 is not activated, position-sensing system 15 may conserve the charge of backup battery 84 by only keeping track of which gear teeth 40 are disposed adjacent sensor element group 52.

Methods of operating position-sensing system 15 are not limited to the examples discussed above in connection with FIGS. 3-6. For instance, information-processing device 54 may employ different techniques for evaluating the relationship between the sensor signals, including, but not limited to, pattern-recognition techniques. Additionally, information-processing device 54 may forgo one or more of the manipulations of the sensor signals discussed above, such as, for example, the steps related to normalizing the values of the sensor signals. Similarly, information-processing device 54 may perform other manipulations of the sensor signals, in addition to those discussed above. Furthermore, methods of operating position-sensing system 15 may omit one or more of the disclosed actions and/or include other actions, in addition to those discussed above and shown in FIGS. 3-6. Moreover, position-sensing system 15 may perform the actions discussed above in different orders than shown in FIGS. 3-6. For example, in the calibration method shown in FIG. 4 and the position-sensing method shown in FIG. 5, information-processing device 54 may perform the mathematical comparisons of sensor signals before normalizing the data, rather than after normalizing the data. Additionally, the disclosed methods may be employed to sense the relative positions of components other than superstructure 14 and inner race/gear 38.

The disclosed embodiments may provide various performance benefits. For example, by determining the positional relationship between sensor element group 52 and inner race/gear 38 based on one or more relationships between the sensor signals, the disclosed methods may automatically compensate for factors that cause variation in all of the sensor signals. These factors may include a non-uniform residual magnetic field in inner race/gear 38, temperature changes, changes in the magnetic field in inner race/gear 38 over time, and various other spurious factors. If such parameters change, the absolute values of the sensor signals may change by a significant amount, but the relationships between the sensor signals may change relatively little, if at all. Thus, by using the relationship between a plurality of the sensor signals, the disclosed embodiments may determine the positional relationship between sensor element group 52 and inner race/gear 38 with a high degree of accuracy, regardless of operating parameter changes that raise or lower the values of all of the sensor signals.

Additionally, sensing the proximity of each sensor element $S_E$ to one of gear teeth 40 by generating a time-varying magnetic field adjacent the sensor element $S_E$ and generating a sensor signal based on the time-varying magnetic field and the magnetic permeability of the area adjacent the sensor element $S_E$ provides certain advantages. This approach obviates any need for inner race/gear 38 to have its own magnetic field that the sensor element $S_E$ can sense. Additionally, this approach combined with the technique of evaluating the relationships between the sensor signals allows determining the positional relationship between sensor element group 52 and inner race/gear 38 highly accurately, regardless of the magnitude and/or uniformity of the magnetic field in inner race/gear 38. Furthermore, this approach allows sensing the positional relationship between sensor element group 52 and inner/race gear 38 without having any of the sensor elements $S_E$ physically contacting inner race/gear 38, which could result in undesirable wear and/or damage to the sensor elements $S_E$.

Furthermore, the disclosed methods of calibrating position-sensing system 15 may provide certain advantages. For example, gathering data about the sensor signals the sensor elements actually produce after they have been mounted and using that data as reference data for determining the positional relationship between sensor element group 52 and inner race/gear 38 may account for deviations in the position of sensor element group 52 from its theoretical mounting position. Thus, the disclosed calibration methods may accommodate a significant amount of tolerance in the mounting position of sensor element group 52 while still allowing position-sensing system 15 to determine the positional relationship between sensor element group 52 and inner race/gear 38 with a high degree of accuracy.

It will be apparent to those skilled in the art that various modifications and variations can be made in the position-sensing system and methods without departing from the scope of the disclosure. Other embodiments of the disclosed position-sensing system and methods will be apparent to those skilled in the art from consideration of the specification and practice of the position-sensing system and methods disclosed herein. It is intended that the specification and examples be considered as exemplary only, with a true scope of the disclosure being indicated by the following claims and their equivalents.

What is claimed is:

1. An excavator, comprising:
    an undercarriage;
    a superstructure;
    a pivot system operable to pivot the superstructure around an axis relative to the undercarriage, the pivot system including a gear extending around the axis, the gear including a plurality of gear teeth; and
    a position-sensing system, including
        a plurality of sensor elements that each generate a signal related to proximity of the sensor element to at least one of the gear teeth by generating the signal based at least in part on the magnetic permeability of the space adjacent the sensor element and a time-varying magnetic field generated by an electric circuit of the position-sensing system, and
        one or more information-processing devices that determine a positional relationship between the superstructure and the undercarriage at least in part by determining a positional relationship between the gear and the plurality of sensor elements based on a plurality of the signals generated by the sensor elements; and
    wherein the gear is mounted to one of the undercarriage and the superstructure, and the plurality of the sensor elements are mounted to the other of the undercarriage and the superstructure.

2. The excavator of claim 1, wherein the one or more information-processing devices determine an absolute positional relationship between the superstructure and the undercarriage by keeping track of which of the gear teeth is disposed adjacent the plurality of sensor elements.

3. The excavator of claim 2, wherein:
    the pivot system includes a motor operable to pivot the superstructure about the axis relative to the undercarriage; and
    the excavator includes controls that perform closed-loop control of the motor based on the determined absolute positional relationship between the superstructure and the undercarriage.

4. The excavator of claim 2, wherein determining a positional relationship between the gear and the plurality of sensor elements based on a plurality of the signals generated by the sensor elements includes determining the positional relationship based at least in part on a relationship between a plurality of the signals generated by the sensor elements.

5. The excavator of claim 2, wherein determining a positional relationship between the gear and the plurality of sensor elements based on a plurality of the signals generated by the sensor elements includes
    performing a mathematical comparison of two or more of the sensor elements, and
    determining the positional relationship based at least in part on the results of the mathematical comparison.

6. The excavator of claim 2, wherein determining a positional relationship between the gear and the plurality of sensor elements based on a plurality of the signals generated by the sensor elements includes determining the positional relationship based at least in part on a rate at which the magnetic flux density in the space adjacent at least one of the sensor elements changes as a result of the time-varying magnetic field.

7. The excavator of claim 2, wherein at least two of the sensor elements are spaced from one another at least partially in a direction of relative motion between the gear teeth and the plurality of sensor elements.

8. The excavator of claim 7, wherein a distance between an adjacent pair of the sensor elements in the direction of relative motion between the sensor elements and the gear teeth is smaller than a distance between an adjacent pair of the gear teeth in the direction of relative motion between the sensor elements and the gear teeth.

9. The excavator of claim 2, wherein at least two of the sensor elements are spaced from one another at least partially in a direction of relative motion between the gear teeth and the at least two sensor elements.

10. A method of operating an excavator, the excavator having an undercarriage, a superstructure, and a pivot system for pivoting the superstructure about an axis, the pivot system having a gear extending around the axis, and the gear having plurality of gear teeth, the method comprising:
    supporting a plurality of sensor elements adjacent the gear in a manner allowing relative movement between the gear and the plurality of sensor elements, wherein the gear is mounted to one of the undercarriage and the superstructure, and the plurality of sensor elements are supported from the other of the undercarriage and superstructure;

generating with each of a plurality of the sensor elements a sensor signal related to the proximity of the sensor elements to at least one of the gear teeth; and determining an absolute positional relationship between the superstructure and the undercarriage based at least in part on one or more relationships between a plurality of the sensor signals, including keeping track of which of the gear teeth is disposed adjacent the plurality of sensor elements.

11. The method of claim 10, wherein determining the absolute positional relationship between the superstructure and the undercarriage based at least in part on a relationship between a plurality of the sensor signals includes:

performing a mathematical comparison between the value of two or more of the sensor signals; and determining the positional relationship based at least in part on the result of the mathematical comparison.

12. The method of claim 10, wherein determining the absolute positional relationship between the superstructure and the undercarriage based at least in part on a relationship between a plurality of the sensor signals includes:

performing a mathematical comparison of the sensor signals from each adjacent pair of the sensor elements; and determining the positional relationship based on the results of the mathematical comparisons.

13. The method of claim 12, wherein generating the sensor signal related to the proximity of each sensor element to at least one of the gear teeth includes:

generating with an electric circuit a time-varying magnetic field in an area adjacent the sensor element; and generating the sensor signal based at least in part on the magnetic permeability of the area adjacent the sensor element and the time-varying magnetic field.

14. The method of claim 10, wherein generating the sensor signal related to the proximity of each sensor element to at least one of the gear teeth includes:

generating with an electric circuit a time-varying magnetic field in an area adjacent the sensor element; and generating the sensor signal based at least in part on the magnetic permeability of the area adjacent the sensor element and the time-varying magnetic field.

15. The method of claim 10, wherein supporting the plurality of sensor elements adjacent the gear includes supporting two of the sensor elements adjacent the gear teeth and spaced from one another in a direction of relative motion between the gear and the sensor elements, a distance between the two sensor elements being less than a distance between an adjacent two of the gear teeth.

16. The method of claim 10, wherein supporting the plurality of sensor elements adjacent the component in a manner allowing relative movement between the component and the plurality of sensor elements includes supporting a plurality of the sensor elements in a row, the sensor elements in the row being spaced from one another at least partially in a direction of relative motion between the gear and the plurality of sensor elements forming the row.

17. A method of operating an excavator, the excavator having an undercarriage, a superstructure, and a pivot system for pivoting the superstructure about an axis, the pivot system having a gear extending around the axis, and the gear having plurality of gear teeth, the method comprising:

supporting a plurality of sensor elements adjacent the gear in a manner allowing relative movement between the gear and the plurality of sensor elements, including supporting a plurality of the sensor elements in a row, the sensor elements in the row being spaced from one another at least partially in a direction of relative motion between the gear and the plurality of sensor elements forming the row, wherein the near is mounted to one of the undercarriage and the superstructure, and the plurality of sensor elements are supported from the other of the undercarriage and superstructure;

generating with each of a plurality of the sensor elements a sensor signal related to the proximity of the sensor elements to at least one of the gear teeth; and determining an absolute positional relationship between the superstructure and the undercarriage based at least in part on one or more relationships between a plurality of the sensor signals, including performing a mathematical comparison between the value of two or more of the sensor signals, keeping track of which of the gear teeth is disposed adjacent the plurality of sensor elements.

18. The method of claim 17, wherein generating the sensor signal related to the proximity of each sensor element to at least one of the gear teeth includes:

generating with an electric circuit a time-varying magnetic field in an area adjacent the sensor element; and generating the sensor signal based at least in part on the magnetic permeability of the area adjacent the sensor element and the time-varying magnetic field.

19. The method of claim 17, wherein supporting the plurality of sensor elements in the row adjacent the gear includes supporting two of the sensor elements spaced from one another a distance less than a distance between an adjacent two of the gear teeth.

20. The method of claim 19, wherein performing a mathematical comparison between the value of two or more of the sensor signals includes performing a mathematical comparison of the sensor signals from each adjacent pair of the sensor elements.

* * * * *